US009092687B2

(12) United States Patent
Chang et al.

(10) Patent No.: US 9,092,687 B2
(45) Date of Patent: Jul. 28, 2015

(54) AUTOMATICALLY CONVERTING A SIGN AND METHOD FOR AUTOMATICALLY READING A SIGN

(71) Applicant: International Business Machines Corporation, Armonk, NY (US)

(72) Inventors: Ma Jun Chang, Beijing (CN); Yong Deng Hu, Beijing (CN); Ge Jin, Beijing (CN); Yi Chao Li, Beijing (CN); Chi Qi, Beijing (CN); Michael Starkey, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/194,070

(22) Filed: Feb. 28, 2014

(65) Prior Publication Data

US 2014/0239072 A1 Aug. 28, 2014

(30) Foreign Application Priority Data

Feb. 28, 2013 (CN) .......................... 2013 1 0064126

(51) Int. Cl.
*G06K 7/00* (2006.01)
*G06K 19/08* (2006.01)
*G06K 7/14* (2006.01)
*G06K 19/06* (2006.01)

(52) U.S. Cl.
CPC ............ *G06K 7/1417* (2013.01); *G06K 7/1439* (2013.01); *G06K 19/06037* (2013.01)

(58) Field of Classification Search
USPC ............. 235/462.04, 494, 375, 462.09, 462.1
See application file for complete search history.

(56) References Cited

U.S. PATENT DOCUMENTS

| 7,978,911 | B2* | 7/2011 | Cheong et al. ................. 382/164 |
| 8,160,880 | B2 | 4/2012 | Albrecht et al. |
| 8,526,670 | B2* | 9/2013 | Kawabe et al. ................ 382/100 |
| 2004/0089727 | A1* | 5/2004 | Baharav et al. ................ 235/494 |
| 2011/0259962 | A1* | 10/2011 | Picard et al. ................... 235/437 |
| 2012/0145779 | A1* | 6/2012 | Bietenbeck et al. .......... 235/375 |

(Continued)

FOREIGN PATENT DOCUMENTS

WO  WO2012077766 A2  6/2012

OTHER PUBLICATIONS

Angadi et al., "A Texture Based Methodology for Text Region Extraction from Low Resolution Natural Scene Images," International Journal of Image Processing (IJIP), vol. 3, No. 5, Nov. 2009, pp. 229-245.

(Continued)

*Primary Examiner* — Edwyn Labaze
(74) *Attorney, Agent, or Firm* — Yee & Associates, P.C.; Jeffrey S. LaBaw

(57) ABSTRACT

The invention discloses a method and device for automatically converting a sign and a method for automatically reading a sign. The method for automatically converting a sign comprises: disposing a first number of modules dispersedly within the sign, the first number being equal to a number of modules of a two-dimensional code that denote the sign; determining a mapping relation between the first number of modules and the respective modules of the two-dimensional code; and setting the first number of modules respectively to have same properties as the respective modules to which they are mapped of the two-dimensional code, so as to generate a converted sign. With the above method and device for automatically converting a sign, various signs can be automatically converted to machine readable signs, so that people and machines can easily understand these signs.

22 Claims, 7 Drawing Sheets

(56) References Cited

U.S. PATENT DOCUMENTS

| | | | |
|---|---|---|---|
| 2012/0210233 A1 | 8/2012 | Davis et al. | |
| 2012/0281077 A1 | 11/2012 | Cañero Morales et al. | |
| 2013/0021364 A1* | 1/2013 | Azuma et al. | 345/589 |
| 2013/0167355 A1* | 7/2013 | Lutz et al. | 29/428 |
| 2013/0215473 A1* | 8/2013 | Fan et al. | 358/3.28 |
| 2013/0249933 A1 | 9/2013 | Yoshida | |
| 2014/0144996 A1* | 5/2014 | Friedman et al. | 235/494 |

OTHER PUBLICATIONS

Cambra et al, "Towards robust and efficient text sign reading from a mobile phone," 2011 IEEE International Conference on Computer Vision Workshops, Nov. 2011, pp. 64-71.

Canedo-Rodríguez et al., "English to Spanish Translation of Signboard Images from Mobile Phone Camera," IEEE Southeastcon, Mar. 2009, pp. 356-361.

Löthgren, "Automatic Road Sign Reader," Umeå University, Jan. 2005, 9 pages.

Park et al., "Automatic Detection and Recognition of Shop Name in Outdoor Signboard Images," IEEE International Symposium on Signal Processing and Information Technology (ISSPIT 2008), Dec. 2008, pp. 111-116.

Petter et al., "Automatic text detection for mobile augmented reality translation," 2011 IEEE International Conference on Computer Vision Workshops, Nov. 2011, pp. 48-55.

\* cited by examiner

| | QR code | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

AUTOMATICALLY CONVERTING A SIGN AND METHOD FOR AUTOMATICALLY READING A SIGN

This application claims the benefit of priority to China Patent Application Serial No. 201310064126.0, filed on Feb. 28, 2013, the contents of which are hereby incorporated by reference.

BACKGROUND

The present invention relates to a sign for conveying information to people and machines, and more specifically, to a method and a device for automatically converting a sign and a method and a device for automatically reading a sign.

Nowadays, various signs are widely used to convey information to people in urban and rural areas. These signs may be texts such as a sign "P" that denotes a parking lot, graphics such as a sign " ◉ " that denotes a subway station, or a combination of texts and graphics. Since these signs are made using natural languages or graphics, people can easily read them and understand their meanings. However, sometimes it is not easy for machines to read these signs. Conventionally, a machine with a camera takes an image of a sign, and reads the sign and understands its meaning through image recognition. But for certain signs, especially those signs that are complicated or have a small size, it is hard to accurately read and understand them through the aforesaid conventional method, due to insufficient accuracy of the image recognition and difficulty in understanding the natural language per se.

In order to improve readability of a sign to a machine, many solutions have been provided. In one solution, information indicating locations and meanings of various signs placed in a city is collected and stored in a database, so that the machine can query the database to learn the meaning of the sign. However, such solution requires manual collection of the aforesaid information, which is troublesome. In another solution, a machine readable symbol (e.g., a bar code or the like) that denotes the meaning of the sign is printed together with the sign, so that the machine can understand the meaning of the sign by reading the symbol. However, the symbol employed by such solution will occupy space that could have been used for the sign, so that a size of the sign is decreased and thereby its readability is reduced.

SUMMARY

In view of the above problems, the present invention is proposed. An object of the present invention is to provide a method and a device for automatically converting a sign, which can automatically convert various signs (especially those signs that are difficult to be read by a machine) into machine readable signs. Another object of the present invention is to provide a method and a device for automatically reading a sign, for reading the sign converted in the aforesaid manner.

According to an aspect of the present invention, there is provided a method for automatically converting a sign, comprising: disposing a first number of modules within the sign dispersedly, the first number being equal to a number of modules of a two-dimensional code that denotes the sign; determining a mapping relation between the first number of modules and the respective modules of the two-dimensional code; and setting the first number of modules respectively to have same properties as the respective modules to which they are mapped of the two-dimensional code, so as to generate a converted sign.

According to another aspect of the present invention, there is provided a device for automatically converting a sign, comprising: a disposing apparatus configured to dispose a first number of modules within the sign dispersedly, the first number being equal to a number of modules of a two-dimensional code that denotes the sign; a mapping apparatus configured to determine a mapping relation between the first number of modules and the respective modules of the two-dimensional code; and a setting apparatus configured to set the first number of modules respectively to have same properties as the respective modules to which they are mapped of the two-dimensional code, so as to generate a converted sign.

According to another aspect of the present invention, there is provided a method for automatically reading a sign, comprising: determining a mapping relation between a first number of modules disposed dispersedly within the sign and respective modules of a two-dimensional code that denotes the sign, the first number being equal to a number of the modules of the two-dimensional code; setting the respective modules of the two-dimensional code respectively to have same properties as corresponding modules to which they are mapped in the first number of modules, so as to restore the two-dimensional code; and decoding the two-dimensional code, so as to read information that the sign represents.

In the above aspects of the present invention, by embedding modules corresponding to respective modules of a two-dimensional code that denotes a sign (especially a sign that is hard to be read by a machine) within the sign in a particular manner, it is possible to include information that the sign is to represent implicitly within the sign without changing a pattern of the sign substantially, thereby automatically converting the sign into a machine readable sign. In this way, people can understand the information that the sign is to represent by viewing such sign, while the machine can understand the information that the sign is to represent by restoring the two-dimensional code according to the modules embedded in the sign. Furthermore, since the modules are embedded within the sign, they will not occupy space for the sign, thus the sign can be made as large as possible.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
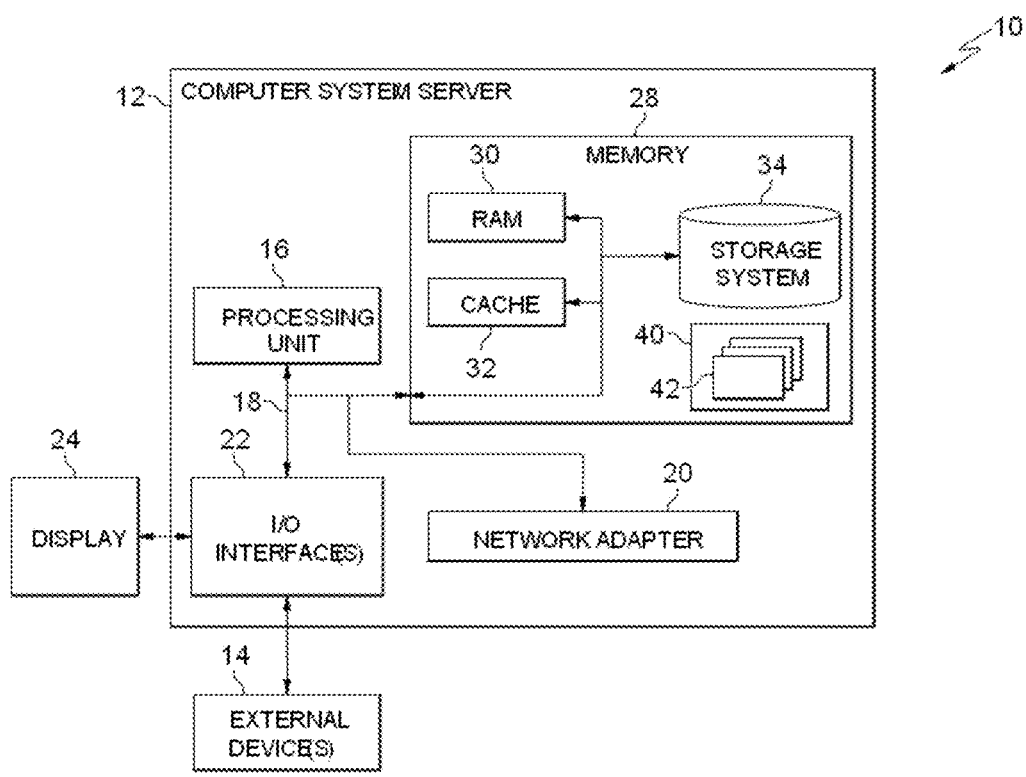
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a method and a device for automatically converting a sign according to embodiments of the present application will be described with reference to accompanying figures.

Briefly, in the embodiments of the present invention, the sign is automatically converted to a machine readable sign by embedding, within the sign, modules corresponding to respective modules of a two-dimensional code that denotes the sign.

Figure 2:
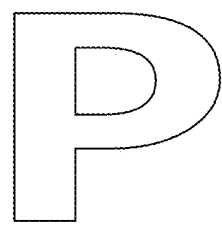
FIG. 2 is a diagram showing a parking lot sign as an example of a sign.

As mentioned above, the sign may be any sign which can convey information, such as a text, a graphic, or a combination of a text and a graphic. Hereinafter, for convenience of description, a parking lot sign "P" is used as an example of the sign, as shown in FIG. 2.

Figure 3:
FIG. 3 is a diagram showing an example of a QR code.

The two-dimensional code may be any matrix-type two-dimensional code or other type of two-dimensional code commonly known in the art, such as a PDF 417 code, a DataMatrix two-dimensional code, a QR code, or the like. Hereinafter, for convenience of description, a QR code is taken as an example of the two-dimensional code. FIG. 3 shows an example of the QR code. Since the QR code is well known in the art, only a brief introduction thereto is made below.

As shown in FIG. 3, the QR code is a square matrix (pattern) formed by a plurality of square modules with a same size, and different data (e.g., binary 1 or 0) are indicated by colors (e.g., black or white) of the respective modules. The QR code includes functional patterns and a coding region. The functional patterns include positioning patterns located at three corners of the QR code, which can be used to locate the QR code, a region for storing version information of the QR code, a region for storing format information of the QR code, and so on. The coding region is used to store information (data) that needs to be conveyed, such as the information that the sign is to represent and so on.

An international standard for the QR code, ISO/IEC18004, developed by the International Organization for Standardization (ISO) define 40 versions of the QR code, i.e., version 1 to version 40. Different versions of the QR code have different numbers of modules. Version 1 of the QR code of version 1 is a matrix of 21 rows*21 columns, and has 21*21 modules in total. Each subsequent version has additional 4 rows and additional 4 columns as compared with a previous version, therefore version 2 of the QR code is a matrix of 25 rows*25 columns, and has 25*25 modules in total, and version 40 of the QR code is a matrix of 171 rows*171 columns, and have 171*171 modules in total. Accordingly, different versions of the QR code have different data capacity, i.e., can represent different amounts of information (data). For example, version 1 of the QR code can represent data of 26 bytes, and version 40 of the QR code can represent data of 3706 bytes.

For a certain sign, for example, the parking lot sign "P", a QR code that denotes the sign may be generated by a method commonly known in the art. Here, the QR code that denotes the sign can be a two-dimensional code which denotes the information that the sign is to represent. For example, the information that the parking lot sign "P" is to represent may include various pieces of information, such as information indicating that here is a parking lot, an opening hour of the parking lot, rates, a number of parking spaces, and the like. Specifically, firstly a version of the QR code may be selected based on information amount of the sign, i.e., data amount (e.g., a number of bytes) required by the information that the sign is to represent. As described above, the amount of information that can be represented by different versions of the QR code are different, thus it is necessary to select the version of the QR code whose data capacity is not less than the information amount of the sign according to the information amount of the sign. For example, if the information amount of the sign is 20 bytes, version 1 may be selected, and if the information amount of the sign is 3700 bytes, version 40 may be selected. Then, the QR code that denotes the sign may be generated by the method commonly known in the art according to the selected version of the QR code.

Hereinafter, a method for automatically converting a sign according to an embodiment of the present invention will be described in detail with reference to FIG. 4.

Briefly, for a certain sign, the method renders information that the sign is to represent to be included explicitly within the sign by embedding, within the sign, modules corresponding to respective modules of a two-dimensional code that denotes the sign, so as to thereby automatically converts the sign to a machine readable sign. Here, the QR code is taken as an example of the two-dimensional code. As described above, a version of the QR code may be selected based on data amount required by the information that the sign is to represent, and then the QR code that denotes the sign can be generated based on the version of the QR code. Of course, if the QR code that denotes the sign has already existed, the operations of selecting the version and generating the QR code may be omitted.

Figure 4:
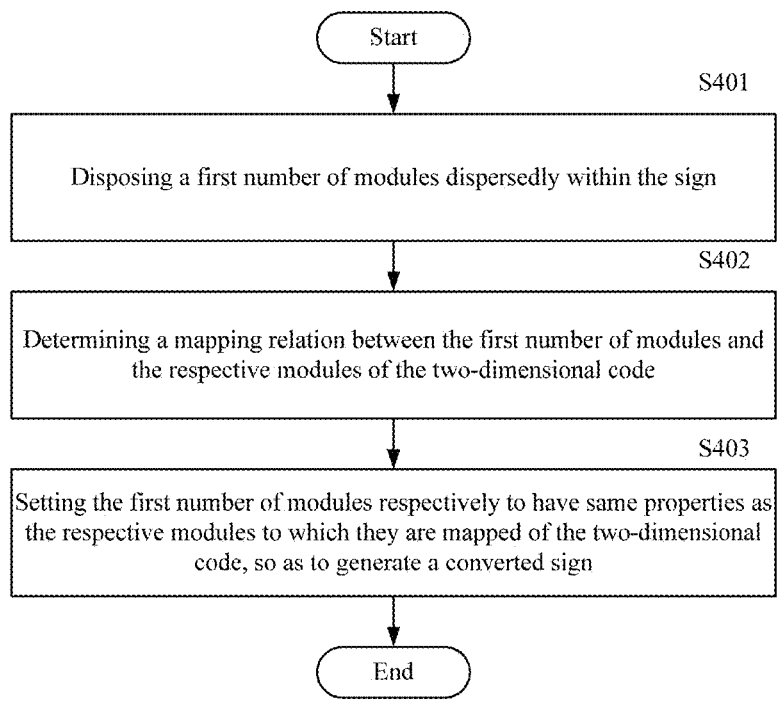
FIG. 4 is a flowchart showing a method for automatically converting a sign according to an embodiment of the present invention.

Specifically, as shown in FIG. 4, in step S401, a first number of modules are disposed dispersedly within the sign, the first number being equal to a number of modules of the QR code that denote the sign. Here, "a first number of modules are disposed dispersedly within the sign" means disposing the first number of modules dispersedly, such that any part of each of the module is within the sign or on borders of the sign, instead of crossing the borders of the sign or being outside of the sign.

Since the number of the modules of the QR code depends on the version of the QR code, the first number may be determined according to the version of the QR code selected when the QR code is generated, or according to the version of the QR code determined through the QR code that has already existed. Furthermore, the modules disposed dispersedly within the sign may be squares, rectangles or in other shapes, and in the embodiments of the present invention, square modules are disposed dispersedly within the sign in order to simplify operation. In addition, the modules disposed dispersedly may have a same size or a different size, and likewise, the modules having the same size are employed here in order to simplify operations.

A variety of methods may be used to perform step S401, so as to dispose the first number of modules within the sign. In a first exemplary method, the modules to be disposed dispersedly may be set to a first size, and then it is determined whether the first number of modules with the first size can be disposed dispersedly within the sign. If so, the first number of modules with the first size are disposed dispersedly within the sign, and the disposing operation is completed. Conversely, if the first number of modules with the first size cannot be disposed dispersedly within the sign, the first size is too large and thus is reduced by a certain amount to obtain a second size, and then it is determined whether the first number of modules with the second size can be disposed dispersedly within the sign. If so, the first number of modules with the second size are disposed dispersedly within the sign, and the disposing operation is completed. Conversely, if not, the operation of reducing the size and the determining operation described above are repeated, until the first number of modules can be disposed dispersedly within the sign.

In a second exemplary method, the size of the modules to be disposed dispersedly within the sign may be selected according to the version of the QR code, such that a second number of modules can be disposed dispersedly within the sign, where the second number is not less than the number of the modules of the QR code that denotes the sign (i.e., the first number). Thereafter, the first number of modules are selected from the second number of modules in accordance with a predetermined rule, for use in subsequent operations.

Hereinafter, the second exemplary method will be described in detail with reference to FIGS. 5 and 6A-6B, taking the parking lot sign "P" as an example. As shown in FIG. 6A, it is assumed that the sign "P" has a width W and a height H, and a side length of the modules to be disposed dispersedly within the sign is M, that is, the size of the modules is M*M.

Figure 5:
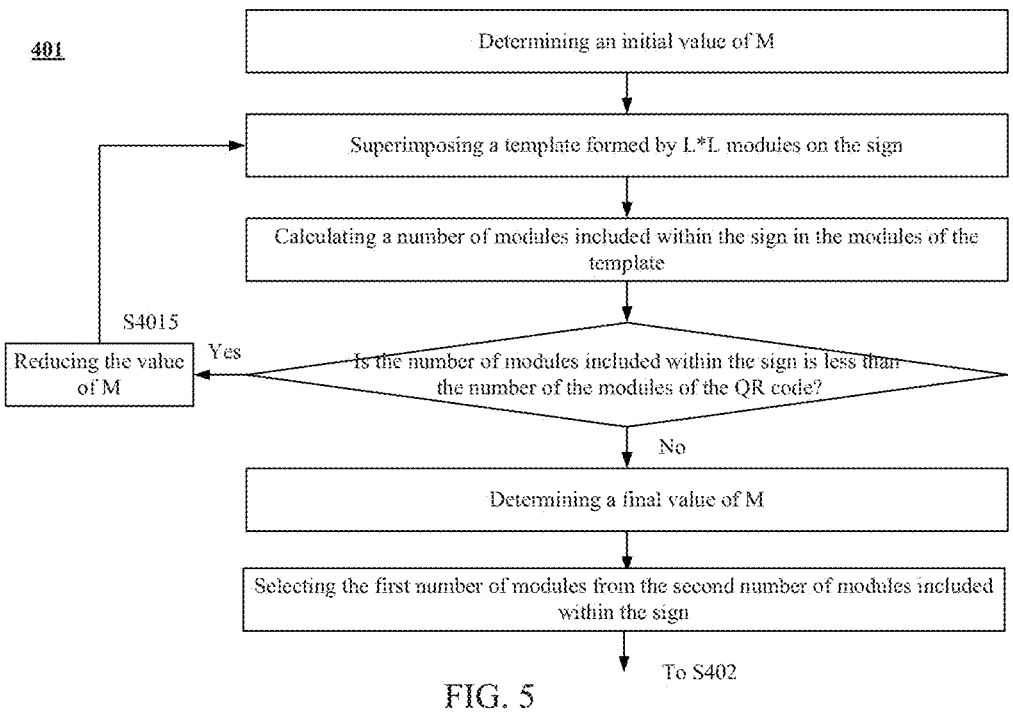
FIG. 5 is a flowchart showing exemplary operations in step S401 shown in FIG. 4.
Figure 6A:
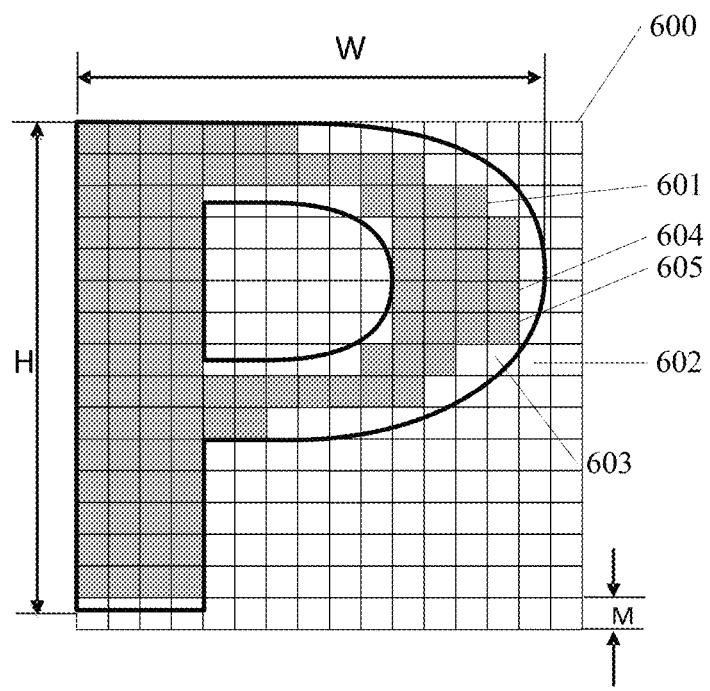
FIGS. 6A and 6B schematically show a process of disposing modules dispersedly within the sign.
Figure 6B:
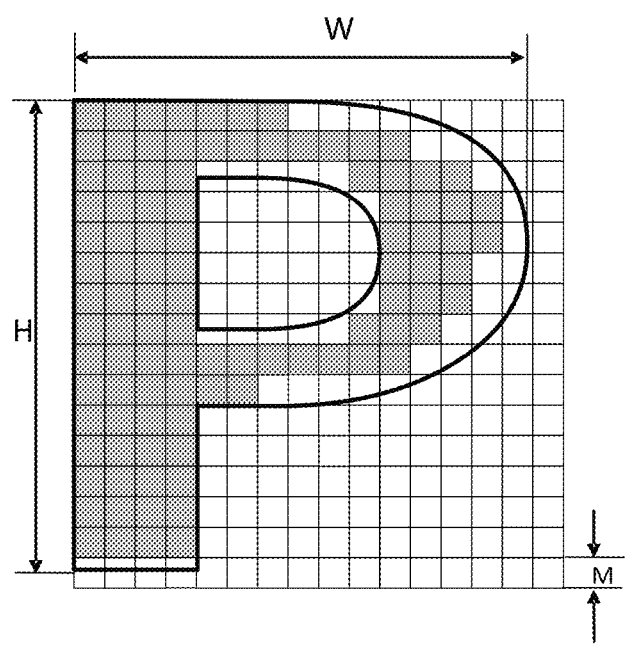

With reference to FIG. 5, in step S4011, an initial value of M is determined. For example, the number of the modules of the QR code may be determined according to the version of the QR code, thereby the first number of the modules to be disposed dispersedly within the sign is determined, then the initial value of M is estimated roughly by experience according to the first number and the size (the width W and the height H) of the sign. Alternatively, the initial value of M may be determined in other ways, as shown by a code segment 1 described later.

Then, in step S4012, a template formed by L*L modules is superimposed on the sign "P", where L may be calculated by the following equation (1):

$$L = \text{ceil}(\max(H, W)/M) \qquad (1)$$

where max (H, W) is a function for obtaining a larger value in H and W, ceil( ) is a ceiling function for obtaining the smallest integer not less than max(H,W)/M. The template superimposed on the sign in this way is a smallest square that covers the sign. In the example shown in FIG. 6A, it is assumed that L obtained by using the above equation (1) is 16, then a template 600 formed by 16*16 modules is superimposed on the sign "P". When the template is superimposed on the sign, preferably some edges of the template and the sign are aligned with each other in a predetermined manner, so that when a sign finally generated is read, the modules within the sign can be recognized in accordance with the alignment manner, i.e. according to the aligned edges of the template and the sign. For example, in the example shown in FIG. 6A, left and upper edges of the template can be aligned with left and upper edges of the sign "P", respectively.

Next, in step S4013, a number of modules included (placed) within the sign "P" in the modules of the template is calculated. Likewise, the module included within the sign refer to a module which is located within the sign in whole, and if some part of the module goes beyond borders of the sign, the module is not included within the sign "P". In the example shown in FIG. 6A, 102 gray modules (e.g., module 601) are included within the sign "P", whereas white modules (e.g., modules 602 and 603) are not included within the sign "P".

Then, in step S4014, it is determined whether the number of the modules included within the sign "P" is less than the number of the modules of the QR code.

If the number of the modules included within the sign "P" is less than the number of the modules of the QR code, this means that a current value of M is too large, therefore the value of M is reduced in step S4015, and steps S4012-S4014 are repeated until it is determined in step S4014 that the number of the modules included within the sign "P" is not less than the number of the modules of the QR code.

If it is determined in step S4014 that the number of the modules included within the sign "P" is not less than the number of the modules of the QR code, the current value of M is appropriate, therefore in step S4016, the current value of M is determined as an optimum value of M. Thereafter, in step S4017, the first number of modules are selected from the modules included within the sign "P" (i.e. the second number of modules), as the modules disposed dispersedly within the sign "P" to be used in subsequent steps. This selection may be performed according to a predetermined rule. Specifically, (the second number–the first number) of modules may be removed from the second number of modules in accordance with the predetermined rule to select the first number of modules, thereby the disposing operation is completed. The predetermined rule may, for example, specify positions of the modules to be removed. In the example of FIG. 6A, in order to simplify illustration, it is assumed that the QR code that denotes the sign "P" is a matrix formed by 10*10 modules, although the QR code with this size is not defined in the international standard for the QR code. In this case, the first number is 100. Since the number (second number) of the modules included within the sign "P" is 102 larger than 100, 100 modules can be selected from the 102 modules by removing two modules 604 and 605 located at positions designated by the predetermined rule, as the modules disposed dispersedly within the sign "P" to be used in subsequent steps, as shown in FIG. 6B, thereby the disposing operation is completed.

The above second exemplary method may be implemented through dichotomy, as shown in the following code segment 1.

```
[code segment 1]
x = 1;
y = max (W, H);
while (x <y) {
    m = (x+y) /2;
    if (f (m) <req) {y = m–1;}
        else if (f (m)> = req) {x = m;}
    }
return x;
```

In the code segment 1, x, y and m are variables, m represents the side length M of the modules, and an initial value of m is set to (x+y)/2. f(m) is, for the value of m, the number of the modules included within the sign which is obtained in the manner described in accordance with steps S4012 and S4013, req is the first number described above, x returned by the code segment 1 is the optimum value of M. After determination of the optimum value of M by dichotomy, the first number of modules may be selected through step S4017, thereby the disposing operation is completed.

In the above exemplary method, if a certain value of M which enables modules not less than the number of the modules of the QR code to be disposed dispersedly within the sign is found, the value of M is considered to be appropriate, and thus will be determined as the optimum value. It is conceivable, however, that if the value of M is selected to be very small, although the condition of "enabling modules not less than the number of the modules of the QR code to be disposed dispersedly within the sign" may be satisfied, the modules disposed dispersedly have a very small size and thus are difficult to be recognized, thereby readability of a machine readable sign finally generated is reduced. To avoid this problem, it is feasible to, on the premise of satisfying the above condition, make the value of M as large as possible, i.e., make the modules disposed dispersedly within the sign be distributed in a most part of space within the sign, rather than being congregated in a small part of space within the sign (e.g., a certain corner of the sign). Thus, in a third exemplary method, a maximum value of M which satisfies the above condition is found as the optimum value, then the first number of modules are disposed dispersedly within the sign according to the maximum value of M. Specifically, when it is determined in step S4014 that the number of the modules included within the sign "P" is not less than the number of the modules of the QR code, the value of M is increased, and then it is judged whether the increased value of M can satisfy the above condition. If not, the value of M before the increase is the maximum value of M satisfying the above condition. Conversely, if the increased value of M can still satisfy the above condition, then the above operation of increasing the value of M and the judging operation are repeated, until it is determined that the increased value of M can not satisfy the above condition, so as to determine the maximum value of M. Then, by using the determined maximum value of M, the first number of modules are disposed dispersedly within the sign, such that the internal space of the sign is filled with or substantially filled with the first number of modules.

Returning to FIG. 4, in step S402, a mapping relation between the first number of modules disposed dispersedly within the sign and the respective modules of the QR code is determined.

The mapping relation may be established by mapping the first number of modules disposed dispersedly within the sign to the respective modules of the QR code in a predetermined order. As mentioned above, the first number is the number of the modules of the QR code, therefore the mapping relation between the two sets of modules may be established by making them correspond to each other one by one in the predetermined order. Said predetermined order may be any order selected depending on design requirements.

Figures 7A, 7B:
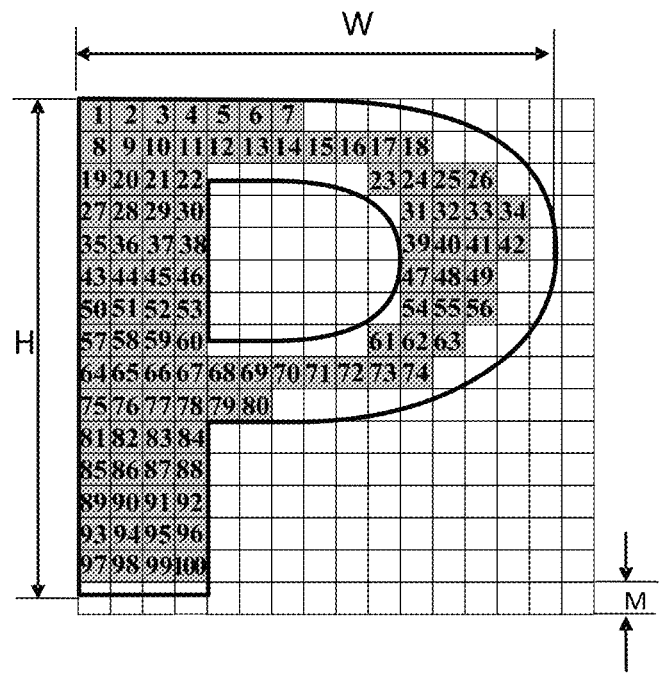
FIGS. 7A and 7B schematically show an operating process of step S402 shown in FIG. 4.

In one mapping method, firstly, sequence numbers may be assigned to the first number of modules disposed dispersedly within the sign in a first order. For example, in the example shown in FIG. 6, sequence numbers 1-100 may be assigned to 100 modules disposed dispersedly within the sign in a left-to-right and top-to-bottom order, as shown in FIG. 7A. Thereafter, the modules disposed dispersedly within the sign "P" and having different sequence numbers may be mapped to the respective modules of the QR code in a second order. For example, the modules disposed dispersedly within the sign "P" and having the sequence numbers 1-100 may be mapped to the respective modules of the QR code in a left-to-right and top-to-bottom order in the QR code. In this case, assuming that a certain module disposed dispersedly within the sign has a sequence number n, and the QR code is a matrix of v rows*v columns, i.e., each row of the QR code has v modules, then the module n disposed dispersedly within the sign can be mapped to a (i,j)-th module of the QR code, where:

$$i=\text{floor}((n-1)/v)+1, j=(n-1)\% v+1 \quad (2)$$

where i is a row number of the QR code matrix, j is a column number of the QR code matrix, floor( ) is a floor function for obtaining a maximum integer not greater than (n−1)/v, "%" is a reminder operator for obtaining a remainder of (n−1)/v. FIG. 7B shows the mapping relation established by mapping the modules disposed dispersedly within the sign "P" and having the sequence numbers 1-100 shown in FIG. 7A to the respective modules of the QR code in accordance with the above mapping method, and in this figure, the number in each module of the QR code indicates the sequence number of a module disposed dispersedly within the sign which is mapped to the each module. It is to be noted that in FIG. 7B, colors of the respective modules of the QR code are not shown to simplify illustration.

Returning to FIG. 4, in step S403, the first number of modules are set respectively to have same properties as the respective modules to which they are mapped of the QR code, so as to generate a converted sign, i.e. a machine readable sign.

Figure 8:
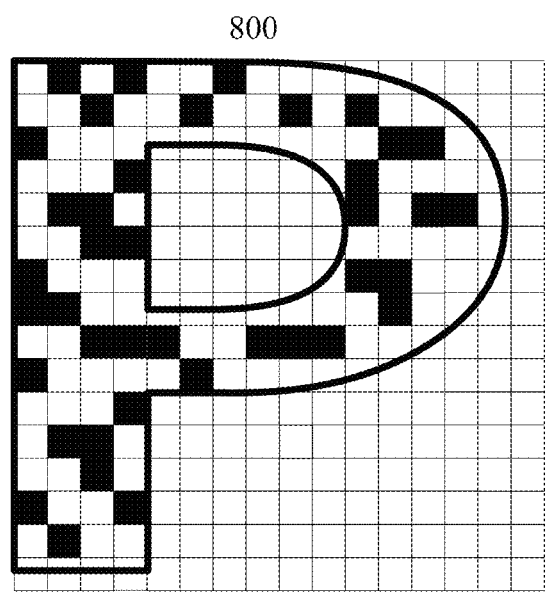
FIG. 8 shows an example of a machine readable sign obtained by converting the parking lot sign shown in FIG. 2.

As described above, the QR code denotes data by the colors of the respective modules, therefore, for the QR code, the properties are colors of the modules. Thus, in step S403, the first number of modules disposed dispersedly within the sign are set respectively to have the same colors as the respective modules to which they are mapped of the QR code. This is actually equivalent to embedding the respective modules of the QR code that denotes the sign into the sign, so that the information that the sign is to represent is included explicitly in the sign, and thereby the sign is converted into the machine readable sign. FIG. 8 illustrates an exemplary pattern of a sign 800 obtained by setting the modules 1-100 in the sign "P" shown in FIG. 7A respectively to have the same colors as the colors (not shown) of the modules to which they are mapped of the QR code.

Figure 9:
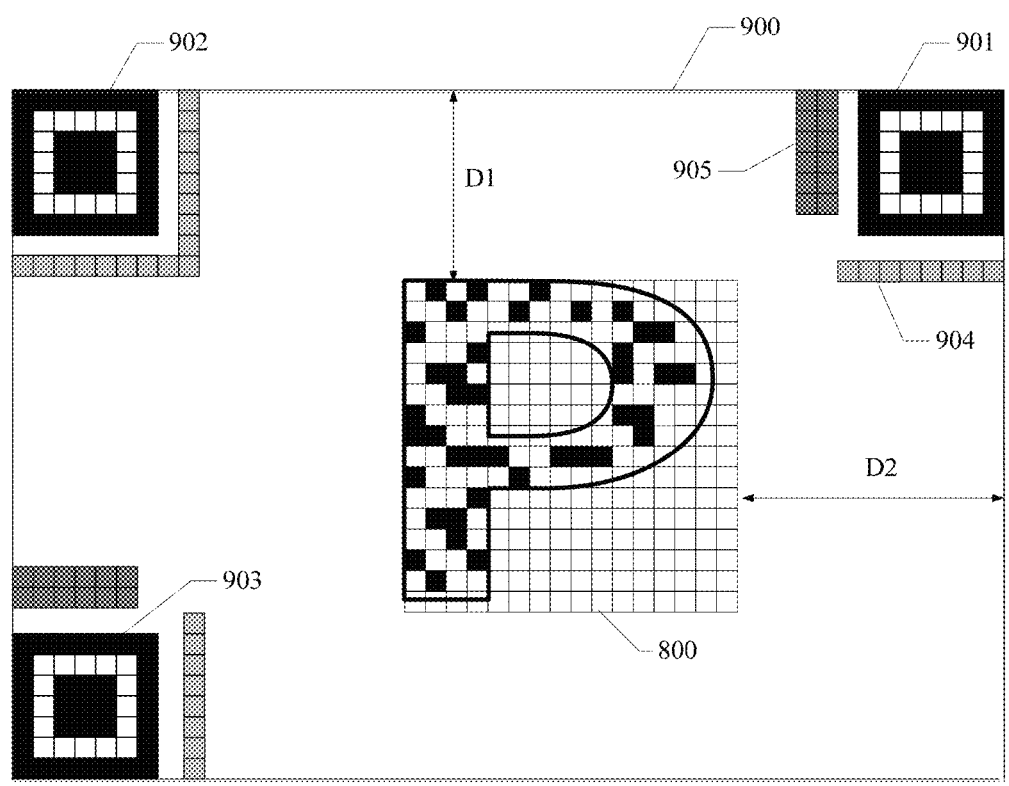
FIG. 9 shows an example of a QR code generated based on the sign shown in FIG. 8.

To facilitate reading by a machine the machine readable sign obtained through the above conversion, a new QR code may be generated based on the sign, and version information of the QR code embedded in the sign, which is required for reading the sign, may be stored in a predetermined position within the new QR code. Take the sign 800 shown in FIG. 8 as an example. A QR code 900 including the sign 800 may be generated, as shown in FIG. 9, and the QR code 900 has three positioning patterns 901-903 for locating the QR code 900. A distance D1 at which the sign 800 is from an upper edge of the QR code 900 and a distance D2 at which the sign 800 is from a right edge of the QR code 900 are stored in a region 904, so that a position of the sign 800 in the QR code 900 can be determined by reading the information in the region 904. In addition, the version information of the QR code embedded in the sign 800 (e.g., the QR code shown in FIG. 7B) may be stored in a region 905, such that the version of the QR code embedded in the sign 800 can be determined by reading the information in the region 905.

Thus, instead of a traditional sign (e.g., the sign as shown in FIG. 2), the QR code 900 that includes the sign 800 as shown in FIG. 9 may be printed and placed somewhere in urban or rural areas, such that people and machines can easily identify the sign.

Of course, the above QR code 900 may not be generated, and the sign 800 shown in FIG. 8 may be printed directly and placed somewhere in urban or rural areas, so as to convey corresponding information to people. In this case, to facilitate reading the sign 800 by a machine, the version information and positioning information for locating the sign 800 may be printed together with the sign 800.

Thus, with the above method for automatically converting a sign, various signs (in particular, signs that may be difficult for machines to read) can be converted to machine readable signs, therefore readability of the signs to machines is improved.

Hereinafter, a method for automatically reading a sign according to an embodiment of the present invention will be described with reference to FIG. 10, the sign being, for example, placed somewhere in urban or rural areas. With this method, a machine readable sign obtained in the above-described manner, such as the sign shown in FIG. 8 or 9, can be read, where a plurality of modules are disposed dispersedly within the sign. Likewise, a description is made here by taking a QR code as an example.

Figure 10:
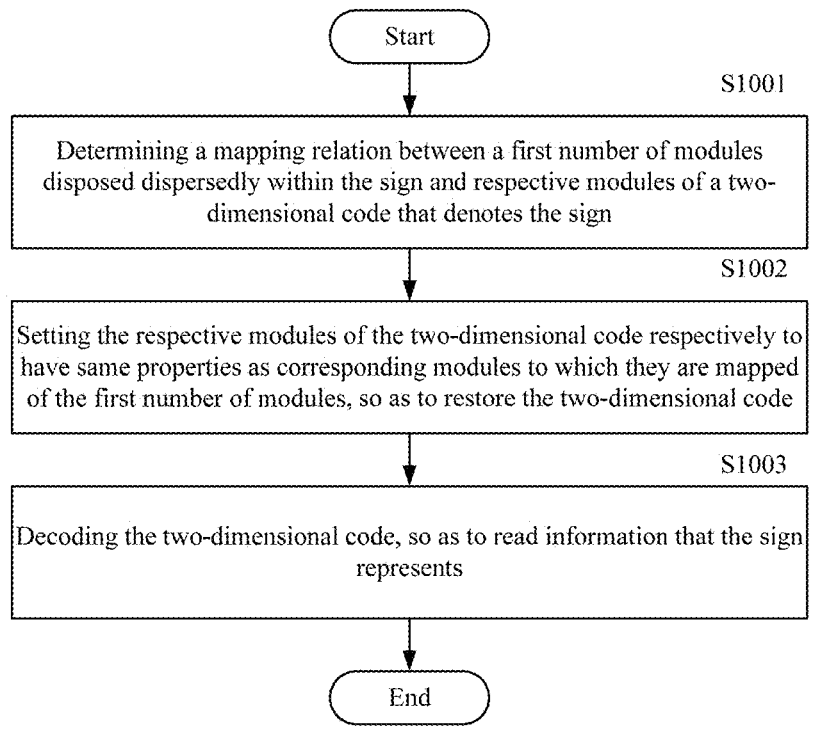
FIG. 10 is a flowchart showing a method for automatically reading a sign according to an embodiment of the present invention.

As shown in FIG. 10, in step S1001, a mapping relation between a first number of modules disposed dispersedly within the sign and respective modules of a QR code that denotes the sign is determined, the first number being equal to a number of the modules of the QR code. In the method for automatically converting a sign described above, the information that the sign is to represent has not been changed, therefore, the "QR code that denotes the sign" described here is actually the same as the "QR code that denotes the sign" described above with reference to FIG. 4.

As mentioned above, when the sign is generated, information denoting a version of the QR code is recorded in association with the sign. Thus, the number of the modules of the QR code can be determined according to the version of the QR code, thereby determining the first number.

In addition, a number (i.e. second number) of modules included within the sign can be identified and calculated by a template formed by a plurality of modules which has been superimposed on the sign (as shown in FIG. 8). For example, the modules included within the sign can be identified and the second number can be calculated by using aligned edges of the template and the sign as a reference. The second number may be greater than the first number, that is, greater than the number of the modules of the QR code. For example, the number of the modules included within the sign 800 shown in FIG. 8 is 102, which is greater than the number, 100, of the modules of the QR code. In order to correctly restore the QR code, it is necessary to select the first number of modules from the second number of modules according to a predetermined rule. Here, the selection is performed by using the rule which is the same as that used when the sign is generated (i.e., the rule described above with respect to step S4016 shown in FIG. 5).

For the first number of modules, they may be mapped to the respective modules of the QR code in a predetermined order, so as to establish the mapping relation. The predetermined order may be the mapping order used when the sign is generated, i.e., the order described above with respect to step S402 shown in FIG. 4.

Next, in step S1002, the respective modules of the QR code are set respectively to have same properties as corresponding modules to which they are mapped of the first number of modules, so as to recover the QR code. For the QR code, the properties are colors of the modules, therefore in this step, the respective modules of the QR code are set respectively to have same colors as the corresponding modules to which they are mapped of the first number of modules, thereby the QR code that denotes the sign may be restored.

Then, in step S1003, the two-dimensional code is decoded to read the information represented by the sign. The method for decoding the two-dimensional code is commonly known in the art, and a description thereof is omitted here.

With the above reading method, the machine readable sign generated by the method for automatically converting a sign according to an embodiment of the present invention can be easily read.

Hereinafter, a device for automatically converting a sign according to an embodiment of the present invention is described with reference to FIG. 11. The device can perform the above method for automatically converting a sign. Briefly, the device automatically converts the sign to a machine readable sign by embedding, within the sign, modules corresponding to respective modules of a two-dimensional code that denotes the sign. Hereinafter, a QR code is still used as an example of the two-dimensional code.

Figure 11:
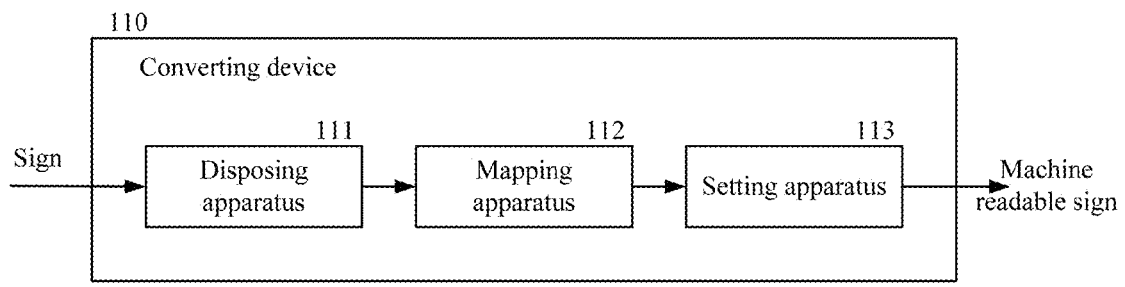
FIG. 11 is a block diagram showing a device for automatically converting a sign according to an embodiment of the present invention.

As shown in FIG. 11, the device 110 for automatically converting a sign may comprise a disposing apparatus 111, a mapping apparatus 112, and a setting apparatus 113.

In some embodiments, the device 110 may further comprise a version selecting apparatus and a generating apparatus (not shown). The version selecting apparatus selects a version of the QR code based on data amount required by information that the sign is to represent, and the generating apparatus generates the QR code that denotes the sign based on the version of the QR code. The version selecting apparatus and the generating apparatus can select the version of the QR code and generate the QR code in the manner described above, and descriptions thereof are omitted here. The selecting apparatus and the generating apparatus may be omitted in a case where the QR code has already existed.

The disposing apparatus 111 disposes a first number of modules dispersedly within the sign, the first number being equal to a number of modules of the QR code that denotes the sign. As described above, the first number may be determined according to the version of the QR code selected when the QR code is generated, or according to the version of the QR code determined through the QR code which has existed. The disposing apparatus 111 may dispose the first number of modules dispersedly within the sign in the manner described above. For example, the disposing apparatus 111 may make the first number of modules be distributed in a most part of space within the sign, and preferably, make the internal space of the sign be filled with or substantially filled with these modules.

Figure 12:
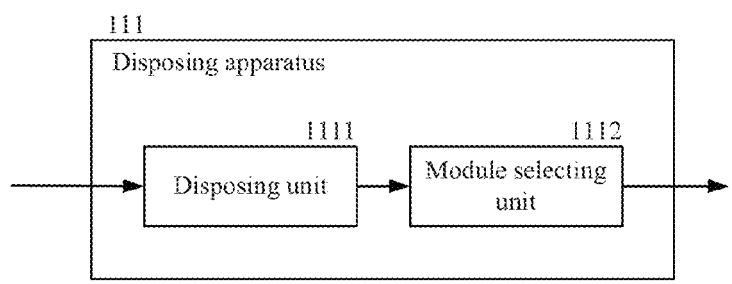
FIG. 12 is a block diagram showing an exemplary structure of a disposing apparatus 111 shown in FIG. 11.

FIG. 12 illustrates an exemplary structure of the disposing apparatus 111. As shown in FIG. 12, the disposing apparatus 111 may include a disposing unit 1111 and a module selecting unit 1112. The disposing unit 1111 may select a size of the modules to be disposed dispersedly within the sign according to the version of the QR code, such that a second number of modules can be disposed dispersedly within the sign, where the second number is not less than a number (i.e., first number) of the modules of the QR code that denotes the sign. The module selecting unit 1112 may select the first number of modules from the second number of modules according to a predetermined rule, for use in subsequent operations. The disposing unit 1111 and the module selecting unit 1112 may dispose the first number of modules dispersedly within the sign in the specific manner described above with reference to FIG. 5 and FIGS. 6A-6B, and detailed descriptions thereof are omitted here.

Returning to FIG. 11, the mapping apparatus 112 determines a mapping relation between the first number of modules and the respective modules of the QR code. Specifically, the mapping unit 112 may establish the mapping relation by mapping the first number of modules disposed dispersedly within the sign to the respective modules of the QR code in a predetermined order. For example, as described above, the mapping apparatus 112 may firstly allocate sequence numbers to the first number of modules disposed dispersedly within the sign in a first order, and then map the modules with different sequence numbers which are disposed dispersedly within the sign to the respective modules of the QR code in a second sequence, thereby establishing the mapping relation.

The setting apparatus 113 sets the first number of modules respectively to have same properties as the respective modules to which they are mapped of the QR code, so as to generate a converted sign. In the case of the QR code, the properties are colors of the modules. Therefore, the setting apparatus 113 sets the first number of modules respectively to have the same colors as the respective modules to which they are mapped of the QR code, thereby converting the sign into a machine readable sign.

As described above, the converted sign may be printed and placed somewhere in urban or rural areas, so as to convey corresponding information to people. In this case, to facilitate reading the sign by a machine, the version information and positioning information for locating the sign may be printed together with the sign. Alternatively, a new QR code may be generated based on the converted sign, and the version information required for reading the sign is stored in a predetermined position in the new QR code, then the new QR code is printed and placed somewhere in urban or rural areas, as described above with reference to FIG. 9.

Thus, with the above device for automatically converting a sign, various signs (especially those signs that are difficult for machines to read) can be converted to machine readable signs, and readability of the signs to machines is improved.

Hereinafter, a device for automatically reading a sign according to an embodiment of the present invention is described with reference to FIG. 13. The device may perform the method described above with reference to FIG. 10, and thus read a sign generated according to the embodiment of the present invention. As shown in FIG. 8 or 9, a plurality of modules is disposed dispersedly within the sign. Here, a description is made by using a QR code as an example.

Figure 13:
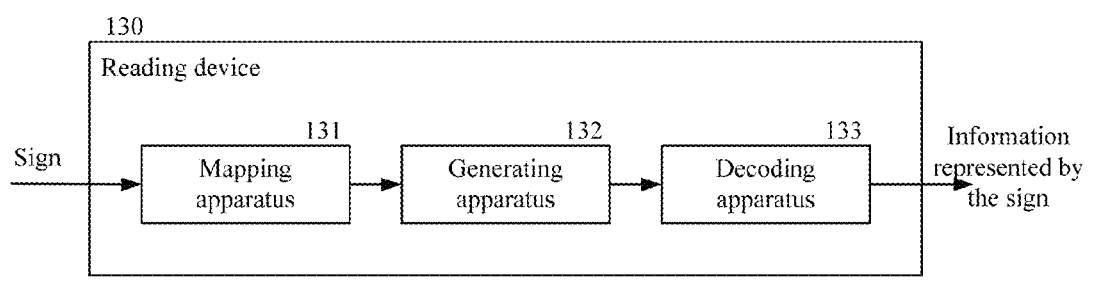
FIG. 13 is a block diagram showing a device for automatically reading a sign according to an embodiment of the present invention.

As shown in FIG. 13, the device 130 for automatically reading a sign may comprise a mapping apparatus 131, a generating apparatus 132 and a decoding apparatus 133.

The mapping apparatus 131 determines a mapping relation between a first number of modules disposed dispersedly within the sign and respective modules of a QR code that denotes the sign, the first number being equal to a number of the modules of the QR code. As described above, the mapping apparatus 131 may determine the number of the modules of the QR code according to the information denoting a version of the QR code, which is recorded in association with the sign when the sign is generated, thereby determining the first number.

Specifically, the mapping apparatus 131 may recognize modules included within the sign through a template formed by a plurality of modules (for example, as shown in FIG. 8) which has been superimposed on the sign and calculate a number (second number) thereof, and then select the first number of modules from the second number of modules in accordance with a predetermined rule. The predetermined rule is the same as that used by the module selection unit 1112. Thereafter, the mapping apparatus 131 may map the first number of modules to the respective modules of the QR code in a predetermined order, so as to establish the mapping relation. The predetermined order is the same as that used by the mapping apparatus 112.

The setting apparatus 132 may set the respective modules of the QR code respectively to have same properties as corresponding modules to which they are mapped of the first number of modules, so as to restore the QR code. For the QR code, the property is colors of the modules, therefore the setting apparatus 132 sets the respective modules of the QR code respectively to have the same colors as the corresponding modules to which they are mapped of the first number of modules.

The decoding apparatus 133 may decode the two-dimensional code by a method commonly known in the art, so as to read the information represented by the sign.

With the above device, the machine readable sign generated by the method for automatically converting a sign according to the embodiment of the present invention can be easily read, which renders that both machines and people can understand the sign.

The method and device for automatically converting a sign and the method and device for automatically reading a sign are described above in conjunction with the specific embodiments of the invention. It is to be appreciated that these embodiments are merely illustrative, and various changes may be made by those skilled in the art to these embodiments without departing from the scope of the present invention. For example, although in the embodiments described above, the square modules are disposed dispersedly within the sign, and the square template is used to perform the disposing operation, shapes of the modules and the template are not limited to square, but may be rectangles or other shapes. In addition, although the QR code is used above to describe the embodiments of the present invention, other types of two-dimensional code may also be used, in which case the properties described above may be other properties, such as shapes or the like, in addition to the colors.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically converting a sign, comprising steps of:
    disposing a first number of modules dispersedly within the sign, the first number being equal to a number of modules of a two-dimensional code that denote the sign;
    determining a mapping relation between the first number of modules and the respective modules of the two-dimensional code; and
    setting the first number of modules respectively to have same properties as the respective modules to which they are mapped of the two-dimensional code, so as to generate a converted sign.

2. The method according to claim 1, further comprising steps of:
    selecting a version of the two-dimensional code according to a data amount required to represent information that the sign is to represent; and
    generating the two-dimensional code that denotes the sign according to the version of the two-dimensional code.

3. The method according to claim 2, wherein the disposing a first number of modules dispersedly within the sign comprises steps of:
    selecting a size of the modules to be disposed dispersedly within the sign according to the version of the two-dimensional code, such that a second number of modules can be disposed dispersedly within the sign, the second number being not less than the number of the modules of the two-dimensional code; and
    selecting the first number of modules from the second number of modules.

4. The method according to claim 1, wherein the disposing a first number of modules dispersedly within the sign comprises steps of:
    disposing the first number of modules entirely within the sign, such that internal space of the sign is filled with the first number of modules and external space of the sign is not filled with the first number of modules such that information that the sign is to represent is included explicitly within the converted sign that is machine-readable.

5. The method according to claim 1, wherein the determining a mapping relation between the first number of modules and the respective modules of the two-dimensional code comprises a step of:
    mapping the first number of modules to the respective modules of the two-dimensional code in a predetermined order.

6. The method according to claim 1, wherein the two-dimensional code is a QR code, and the prosperities are colors of the modules.

7. A computer program product comprising a non-transitory computer readable storage medium having program code embodied thereon that is operable for performing the steps of claim 1 when executed by a data processing system.

8. The method according to claim 1, further comprising:
    determining the first number of modules to be disposed within a designated portion of the converted sign based on an area of a corresponding designated portion of the sign and the respective modules of the two-dimensional code containing data to be disposed in the converted sign.

9. A device for automatically converting a sign, comprising:
    a disposing apparatus configured to dispose a first number of modules dispersedly within the sign, the first number being equal to a number of modules of a two-dimensional code that denote the sign;
    a mapping apparatus configured to determine a mapping relation between the first number of modules and the respective modules of the two-dimensional code; and
    a setting apparatus configured to set the first number of modules respectively to have same properties as the respective modules to which they are mapped of the two-dimensional code, so as to generate a converted sign.

10. The device according to claim 9, further comprising:
    a version selecting apparatus configured to select a version of the two-dimensional code according to data amount required to represent information that the sign is to represent; and
    a generating apparatus configured to generate the two-dimensional code that denotes the sign according to the version of the two-dimensional code.

11. The device according to claim 10, wherein the disposing apparatus comprises:

a disposing unit configured to select a size of the modules to be disposed dispersedly within the sign according to the version of the two-dimensional code, such that a second number of modules can be disposed dispersedly within the sign, the second number being not less than the number of the modules of the two-dimensional code; and a module selecting unit configured to select the first number of modules from the second number of modules in accordance with a predetermined rule.

12. The device according to claim 9, wherein the disposing apparatus disposes the first number of modules entirely within the sign, such that internal space of the sign is filled with the first number of modules external space of the sign is not filled with the first number of modules such that information that the sign is to represent is included explicitly within the converted sign that is machine-readable.

13. The device according to claim 9, wherein the mapping apparatus determines the mapping relation between the first number of modules and the respective modules of the two-dimensional code by mapping the first number of modules to the respective modules of the two-dimensional code in a predetermined order.

14. The device according to claim 9, wherein the two-dimensional code is a QR code, and the prosperities are colors of the modules.

15. A computer program product comprising a non-transitory computer readable storage medium having program code embodied thereon that is operable for performing the steps of claim 9 when executed by a data processing system.

16. The device according to claim 9, further comprising:
a determining apparatus configured to determine the first number of modules to be disposed within a designated portion of the converted sign based on an area of a corresponding designated portion of the sign and the respective modules of the two-dimensional code containing data to be disposed in the converted sign.

17. A method for automatically reading a sign, comprising steps of:

determining a mapping relation between a first number of modules disposed dispersedly within the sign and respective modules of a two-dimensional code that denotes the sign, the first number being equal to a number of the modules of the two-dimensional code;

setting the respective modules of the two-dimensional code respectively to have same properties as corresponding modules to which they are mapped of the first number of modules, so as to restore the two-dimensional code; and decoding the two-dimensional code, so as to read information that the sign represents.

18. The method according to claim 17, wherein the number of the modules of the two-dimensional code is determined by a version of the two-dimensional code.

19. The method according to claim 18, further comprising a step of:

selecting the first number of modules from a second number of modules disposed dispersedly within the sign in accordance with a predetermined rule, the second number being not less than the number of the modules of the QR code.

20. The method according to claim 17, wherein the determining a mapping relation between a first number of modules disposed dispersedly within the sign and respective modules of a two-dimensional code that denotes the sign comprises a step of:

mapping the first number of modules to the respective modules of the second two-dimensional code in a predetermined order.

21. The method according to claim 17, wherein the two-dimensional code is a QR code, and the prosperities are colors of the modules.

22. A computer program product comprising a non-transitory computer readable storage medium having program code embodied thereon that is operable for performing the steps of claim 17 when executed by a data processing system.

\* \* \* \* \*